US012456036B2

(12) United States Patent
Sun et al.

(10) Patent No.: US 12,456,036 B2
(45) Date of Patent: Oct. 28, 2025

(54) DEEP EMBEDDING LEARNING MODELS WITH MIMICRY EFFECT

(71) Applicant: Microsoft Technology Licensing, LLC, Redmond, WA (US)

(72) Inventors: Yuan Sun, Redmond, WA (US); Ye Tu, San Carlos, CA (US); Ying Han, Sunnyvale, CA (US); Chun Lo, Mountain View, CA (US); Shaunak Chatterjee, Sunnyvale, CA (US); Vrishti Gulati, Milpitas, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 982 days.

(21) Appl. No.: 17/556,218

(22) Filed: Dec. 20, 2021

(65) Prior Publication Data
US 2023/0196070 A1 Jun. 22, 2023

(51) Int. Cl.
*G06N 20/20* (2019.01)
*G06N 3/045* (2023.01)
*G06N 3/047* (2023.01)

(52) U.S. Cl.
CPC .......... *G06N 3/045* (2023.01); *G06N 3/047* (2023.01); *G06N 20/20* (2019.01)

(58) Field of Classification Search
CPC ......... G06N 20/20; G06N 3/047; G06N 3/045
See application file for complete search history.

(56) References Cited

U.S. PATENT DOCUMENTS

| | | | |
|---|---|---|---|
| 10,528,973 B2 * | 1/2020 | Marlow | H04L 67/10 |
| 10,769,227 B2 | 9/2020 | Tu et al. | |
| 2010/0049679 A1 * | 2/2010 | Phillips | G06Q 30/02 706/15 |
| 2015/0379429 A1 * | 12/2015 | Lee | G09B 5/00 706/11 |
| 2017/0171139 A1 * | 6/2017 | Marra | H04L 51/214 |
| 2017/0185894 A1 * | 6/2017 | Volkovs | G06N 3/08 |
| 2018/0075146 A1 * | 3/2018 | Petrescu | G06F 16/9535 |
| 2018/0158097 A1 * | 6/2018 | Marlow | G06Q 50/01 |
| 2018/0336490 A1 * | 11/2018 | Gao | G06N 20/00 |
| 2020/0134009 A1 * | 4/2020 | Zhao | G06N 3/044 |
| 2020/0226418 A1 * | 7/2020 | Dorai-Raj | G06F 16/313 |
| 2020/0245009 A1 * | 7/2020 | Saini | H04N 21/23614 |
| 2020/0301805 A1 * | 9/2020 | Cao | G06F 11/3438 |
| 2022/0398605 A1 * | 12/2022 | Chen | G06N 5/01 |
| 2024/0119296 A1 * | 4/2024 | Tanimoto | G06N 3/084 |
| 2024/0256619 A1 * | 8/2024 | Noskov | G06F 16/9024 |

* cited by examiner

*Primary Examiner* — Barbara M Level
(74) *Attorney, Agent, or Firm* — CANTOR COLBURN LLP; Renee D Brown

(57) ABSTRACT

In an example embodiment, a separate mimicry machine-learned model is trained for each of a plurality of different item types. Each of these models is trained to estimate an effect of mimicry for a user (i.e., a user whose user profile or other information is passed to the corresponding mimicry machine-learned model at prediction-time). The output of these models may be either used on its own to perform various actions, such as modifying a location of a user interface element of a user interface, or may be passed as input to an interaction machine-learned model that is trained to determine a likelihood of a user (i.e., a user whose user profile or other information is passed to the interaction machine-learned model at prediction-time) interacting with a particular item, such as a potential feed item.

20 Claims, 11 Drawing Sheets

DEEP EMBEDDING LEARNING MODELS WITH MIMICRY EFFECT

TECHNICAL FIELD

The present disclosure generally relates to technical problems encountered in machine learned models. More particularly, the present disclosure relates to using machine learned models to optimize social networking service user interfaces and feeds.

BACKGROUND

Social networking services are online platforms that people use to build social networks or social relations with other people. In recent years it has become popular for social networking services to provide feeds to users, where updates or items of interest can be presented to users who have logged into the service. The feed may contain, for example, indications that a social networking connection for a user has been promoted, has changed jobs, and so forth. The feed may also contain articles of interest to the user, either because they have some connection to one or more of the user's social networking connections (e.g., an article written by a friend) or because they are linked to an area of interest for the user, as identified by the social network service (e.g., the article is on a subject the user has identified as an area of interest in their user profile).

It can be challenging for the social networking service to determine which of many potential items should be displayed in the feed and the order in which they should be displayed. This is typically handled via one or more algorithms implemented by the social networking service for selection and ranking of potential items to display. Similar algorithms may be used for dynamic user interfaces, which may alter available actions on a screen based on the likelihood that a user will select those actions. For example, if a user is unlikely to share a video, then a "share video" button may be removed from a main screen of a user interface and replaced with a button for a different action the user may be more likely to perform. The "share video" button may be moved to a secondary screen that is more difficult to access.

Whether for feed ranking or dynamic user interface adjustment, these algorithms are based on determining the likelihood that the user will interact with the item in some way (e.g., select it, share it, like it, etc.). This determination is typically performed by a machine-learned model trained by a machine learning algorithm. Such machine-learned models, however, do not adequately capture the impact of certain user behaviors, such as "mimicry," on the likelihood that a user will interact with the item.

Mimicry is the tendency for users to perform actions that are the same as or similar to actions they have seen before. Mimicry is a duplication effect, or the creation of duplicates of an action. For example, a user may be likelier to share an image if the user has seen others share images on the social networking service (such as if the user has had images shared with him or her by other users). Measuring mimicry and using that measured mimicry in a useful way in a machine-learned model can be challenging technologically. First of all, the mimicry effect is not consistent across all users—some users exhibit strong mimicry effects, while others exist none at all or even have a negative mimicry effect where actions are the opposite of the viewed action. Additionally, the response can vary based on the type of action seen. Sharing an image, for example, may result in a different impact as far as mimicry than sharing a video.

Existing machine-learned models, however, are unable to capture this effect and thus suffer a reduction in effectiveness in their determinations of likelihood of interactions with items.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
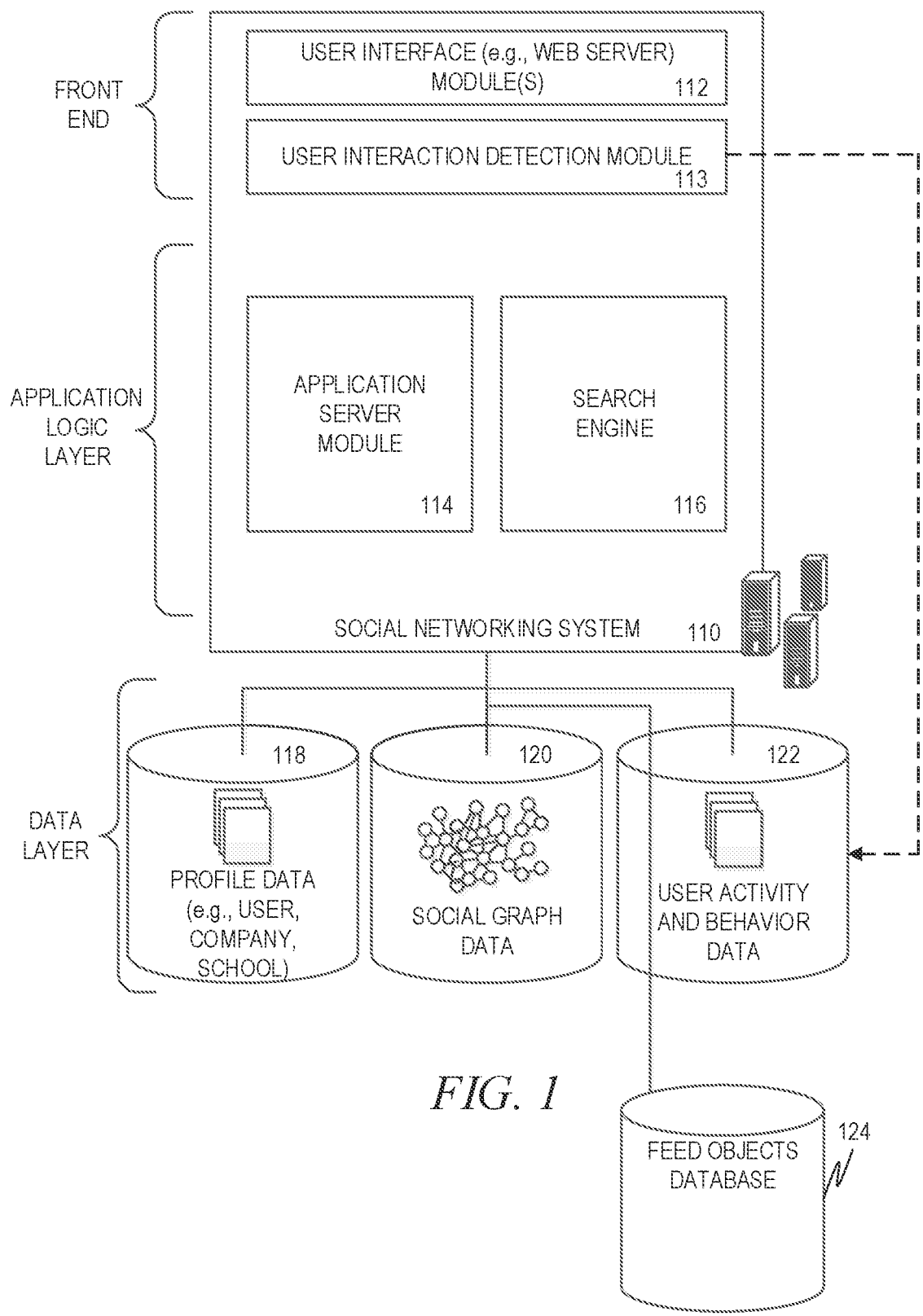
FIG. 1 is a block diagram showing the functional components of a social networking service, including a data processing module referred to herein as a search engine, for use in generating and providing search results for a search query, consistent with some embodiments of the present disclosure.

In an example embodiment, a separate mimicry machine-learned model is trained for each of a plurality of different item types. Each of these models is trained to estimate an effect of mimicry for a user (i.e., a user whose user profile or other information is passed to the corresponding mimicry machine-learned model at prediction-time). The output of these models may be either used on its own to perform various actions, such as modifying a location of a user interface element, or may be passed as input to an interaction machine-learned model that is trained to determine a likelihood of a user (i.e., a user whose user profile or other information is passed to the interaction machine-learned model at prediction-time) interacting with a particular item, such as a potential feed item.

Additionally, in an example embodiment, each of the separate mimicry machine-learned models is trained using a counterfactual regression algorithm. Each separate mimicry machine-learned model has its own user subset of training data, reflecting only training data from users who have interacted with the corresponding type of item. Each of these user subsets is called a treatment group. For example, if there are seven different types of items being evaluated (and therefore seven different mimicry machine-learned models being trained), there will be seven different treatment groups. For the treatment group corresponding to the "image" item type, the treatment group will include only training data from users who have interacted with at least one image. Likewise, for the treatment group corresponding to the "video" item type, the treatment group will include only training data from users who have interacted with at least one video. There may be overlap among these treatment groups (e.g., a particular user's training data may be included both in an "image" treatment group and a "video" treatment group if the user interacted with both images and videos). A common control group is then used with users who are not a part of any of the treatment groups (i.e., users who have not had any interactions with any of the item types represented by treatment groups).

Each separate mimicry machine-learned model is then separately trained using the training data for the common control group and the training data for the treatment group corresponding to the particular item type corresponding to the mimicry machine-learned model.

For each of the treatment groups and the common control group, training data is assembled with user information (e.g., profile information or other information known about each user in the training data). Since a counterfactual regression algorithm is used, during training prediction accuracy is optimized on outcome estimates while minimizing the distribution between treatment groups and control groups in an embedding space.

At evaluation time, the mimicry machine-learned models may be used to determine how much of a mimicry effect is predicted for a user if items of the corresponding type are displayed to that user. More precisely, information about the user, such as profile information, is passed to each of the mimicry machine-learned models. Each of these models then calculates a probability of the user interacting with an item of the corresponding item type if the user was previously exposed to items of the corresponding item type and a probability of the user interacting with an item of the corresponding item type of the user was not previously exposed to items of the corresponding item type. The difference, or delta, between these two probabilities, called a mimicry score, is then considered to be a mimicry effect for that item type for that user. Thus, if there are seven different item types being evaluated, there will be seven different mimicry scores output. These mimicry scores may then be used in one or more different ways in the social networking service.

DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, deep representational learning and counterfactual regression models are leveraged to identify personalized triggers of mimicry behavior in an online network, such as a social networking service. Individualized treatment effects that ignite original creation (e.g., creation of new items and sharing of the new items with others) via the online network can be estimated. This estimation can be performed at a user-level, using just observational data.

Digital content is ubiquitous in multiple avenues of an online service—as a part of a flagship feed, interest feed, emails, notifications, and other products. An example of an online service is a social network service (e.g., LinkedIn® professional networking services). Despite the omnipresence of digital content items on an online service, a technical problem associated with providing relevant digital content to users of the online service is the automatic selecting and presenting of digital content items based on optimizing both the utility to the user who consumes the digital content and the utility to the content creator. For example, in the context of a social networking service (hereinafter also "SNS") that provides professional networking services (e.g., job-finding or recruiter services) or informational services (e.g., education courses, news, or career-related information), many users of online content could benefit from receiving online content that is relevant to them at the particular time they are browsing a website of the SNS. A content creator (e.g., an article author, a blogger, or an influencer) who publishes online content on the SNS may find it useful to receive feedback (e.g., likes, shares, or comments) to the online content generated by him or her. Prior machine-learned models utilized the feedback received regarding previously posted online content as a measure of a value to the content creator of posting such content. This, however, does not factor in effects due to the mimicry phenomenon, and thus results in unreliable recommendations when used to make recommendations. In an example embodiment, a more advanced deep presentation learning based counterfactual regression model is used, which is designed for individualized treatment effect estimations that provide more accuracy than traditional machine-learned models.

In some example embodiments, the content ecosystem in a social networking system can be viewed as a two-sided marketplace of content creators and consumers. The newsfeed (hereinafter also "feed") and notifications interfaces are two example channels used by consumers to engage with content from the creators on the SNS. In some example embodiments, output from one or more mimicry machine-learned models is used to adjust the content creator experience to better encourage content creation.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by a search engine 116 to determine search results for a search query.

Although not shown, in some embodiments, a social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

A feed objects database 124 may contain objects that can be displayed in feeds of one or more members of the social networking service. A feed is a data format used for providing users with frequently updated content. In the social networking service, members may view their feed when they, for example, log into the social networking service. The feed contains one or more objects that the social networking service believes may be of interest to the user. The user feed may contain items from different categories, e.g., job postings, user postings, suggestions for new connections, sponsored posts, etc. Creating the feed means ranking the items from the different categories, merging the items from the different categories, and creating the user feed, which presents the items in sequential order.

Figure 2:
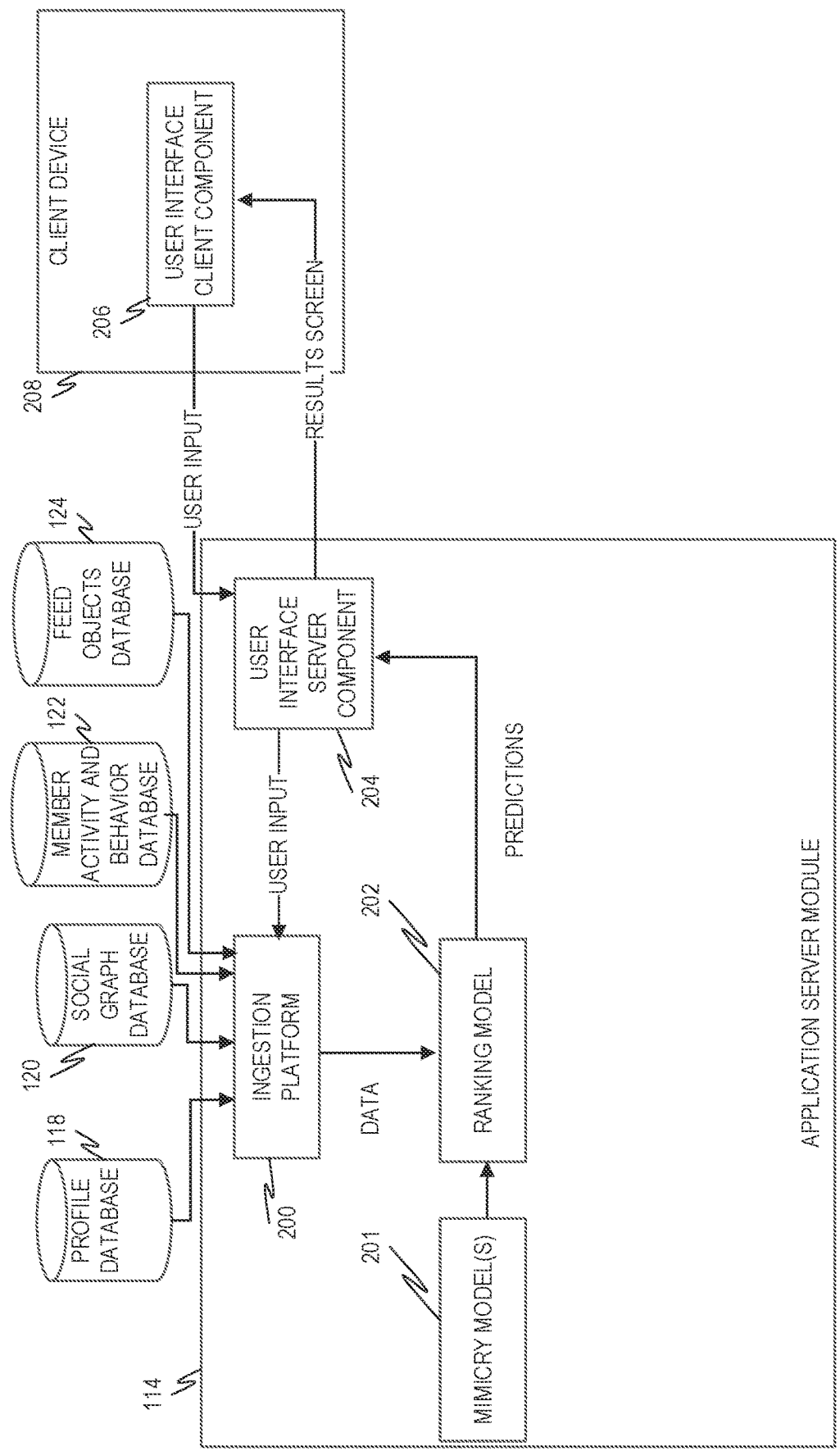
FIG. 2 is a block diagram illustrating the application server module of FIG. 1 in more detail, in accordance with an example embodiment.

FIG. 2 is a block diagram illustrating application server module 114 of FIG. 1 in more detail, in accordance with an example embodiment. While in many embodiments the application server module 114 will contain many subcomponents used to perform various different actions within the social networking system 110, only those components that are relevant to the present disclosure are depicted in FIG. 2.

Here, an ingestion platform 200 obtains information from the profile database 118, the social graph database 120, the user activity and behavior database 122, and/or the feed objects database 124 relevant to a ranking model 202. At training time, the ingestion platform 200 sends this information to one or more mimicry models 201, one for each item type on which a mimicry phenomenon may be suspected, in order to train the one or more mimicry models. Either in conjunction with this, or separately, the ingestion platform 200 sends the information to the ranking model 202 in order to train the ranking model 202. At prediction time, such as when a social networking service needs to determine which feed objects to present to a particular user and in what order, the ingestion platform 200 sends information corresponding to the particular user and one or more items being examined to the one or more mimicry models 201 in order to allow the one or more mimicry models to output mimicry scores indicative of a predicted increase in likelihood of the particular user interacting with the one or more items based on mimicry. Similar information may also be sent to the ranking model 202 in order to allow the ranking model 202 to output a ranking of the various potential feed objects to be displayed in the user's feed, and the mimicry scores from the one or more mimicry models 201 are also sent as input to the ranking model 202.

In some example embodiments, this information is transmitted in the form of feature vectors. For example, each member profile may have its own feature vector formed of the information in the profile database 218, the social graph database 220, and the member activity and behavior database 222.

The concept of feature is related to that of an explanatory variable used in statistical techniques such as linear regression. Choosing informative, discriminating, and independent features is important for effective operation of the machine learning algorithm in pattern recognition, classification, and regression. Features may be of different types, such as numeric, strings, and graphs.

In one example embodiment, the features may be of different types and may include one or more of user features, content features, and item features. The user features may include one or more of the data in the user profile, as described in FIG. 1, such as title, skills, endorsements, experience, education, a number of connections the content creator has via the online social networking service, a number of active connections the content creator has via the online social networking service, identifiers of profile features, an identifier of language preference, a job seniority, a gender, a student identifier, a job seeker identifier, a recruiter identifier, and the like. The content features may include any data related to various content items (e.g., a number of content items the content creator generated previously, types of activities that the content creator has engaged in previously, past session data, past sharing data, one or more identifiers of sources of content that the content creator shared, an indicator that shared content included at least one of an image, rich media, or a hashtag, or a number of notifications received by the content creator). The item features may include any data related to various items, such as item type, category, topics, frequently mentioned terms, authors, and so forth.

A user interface server component 204 communicates with a user interface client component 206 located on a client device 208 to run the ranking model 202 and use its results to display or update a feed to a user. This may be performed in response to a user input, such as a navigation input to a web page that includes the feed. For example, a user could instruct the user interface client component 206 to log into a social networking service account. This log-in information could then be sent to the user interface server component 204, which can use this information to instruct the ingestion platform 200 to retrieve the appropriate information from the profile database 118, the social graph database 120, the member activity and behavior database 122, and/or the feed objects database 124.

The results from the ranking model 202 could then be sent to the user interface server component 204, which, along with the user interface client component 206, could select and format appropriate feed objects for display to the user. Details about how these objects could be displayed on the client device 208 via the user interface client component 206 will be described in more detail below.

Figure 3:
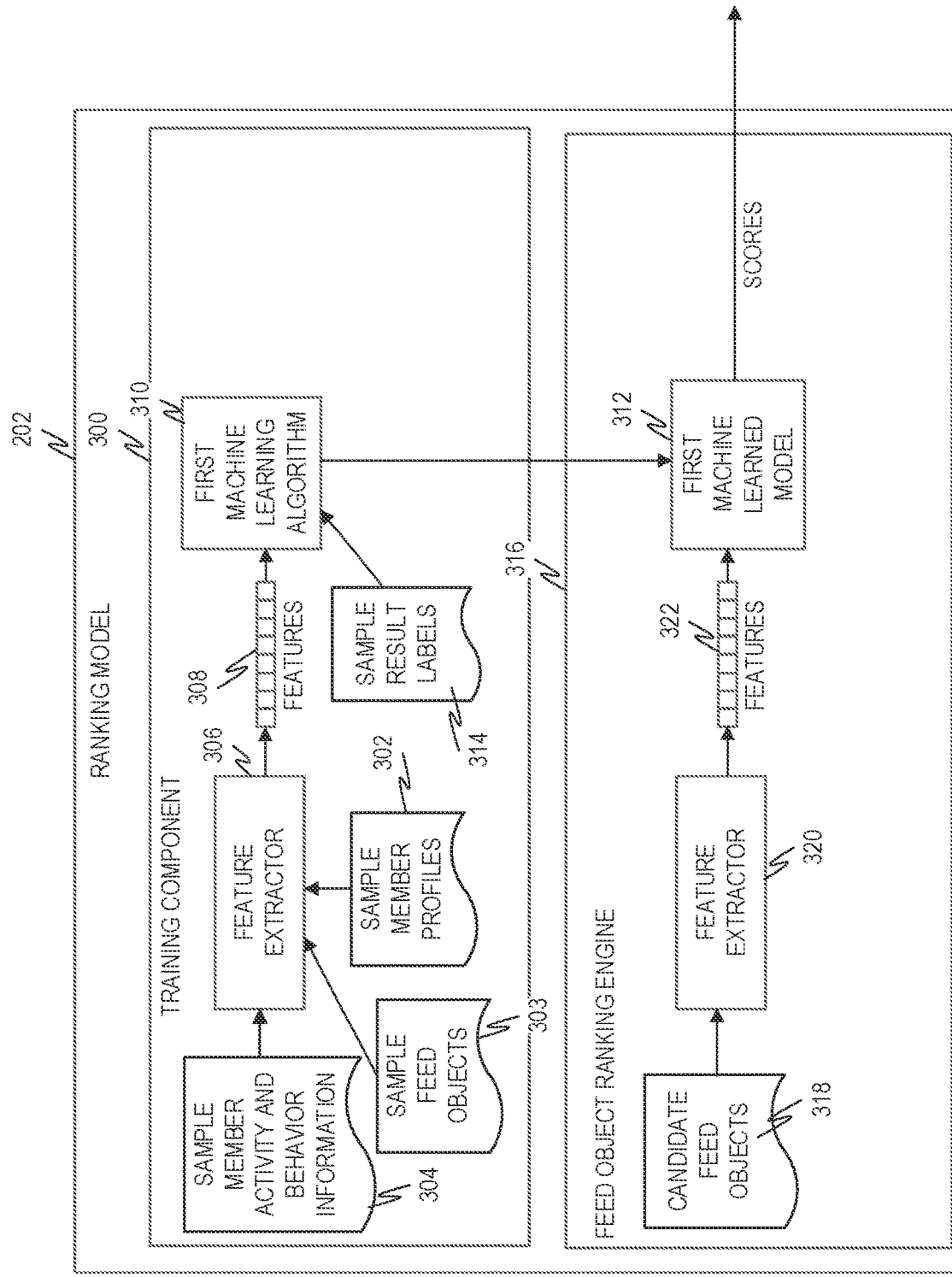
FIG. 3 is a block diagram illustrating the ranking model of FIG. 2 in more detail, in accordance with an example embodiment.

FIG. 3 is a block diagram illustrating the ranking model 202 of FIG. 2 in more detail, in accordance with an example embodiment. In a training component 300, sample member profiles 302, sample feed objects 303, and/or sample member activity and behavior information 304 are fed to a feature extractor 306, which acts to extract curated features 308 from the sample member profiles 302, sample feed objects 303, and/or sample member activity and behavior information 304. A feature is a variable pertaining to an input piece of data. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, and so forth. The feature may also be some aspect of the sample feed objects, such as title, frequently appearing terms, and/or various metrics about the object, such as frequency of occurrence of key words.

In an example embodiment, the curated features 308 are then used as input to a machine learning algorithm 310 to train a machine learned model 312 to generate a probability that a feed object should be displayed to a particular user. While this probability may be based on the likelihood that the user may interact in some way with the feed object, as will be described in more detail below, it may also be based on the effect of viral actions by the user or downstream users, as well as the relative value of these effects on the social networking service as a whole. In certain types of machine learning algorithms, the training may include providing sample result labels 314 to the machine learning algorithm 310. Each of these sample result labels 314 is a score indicating a likelihood that a corresponding sample feed object should be displayed to a user.

The machine learning algorithm 310 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

In a feed object ranking engine 316, candidate feed objects 318 are fed to a feature extractor 320, which acts to extract curated features 322 from the candidate feed objects 318. The curated features 322 are then used as input to the machine learned model 312, which outputs a score indicating the likelihood that the corresponding candidate feed objects 318 should be displayed in the feed.

In an example embodiment, the machine learned model 312 is trained in such a manner that it is able to output a score for each potential feed item.

Figure 4:
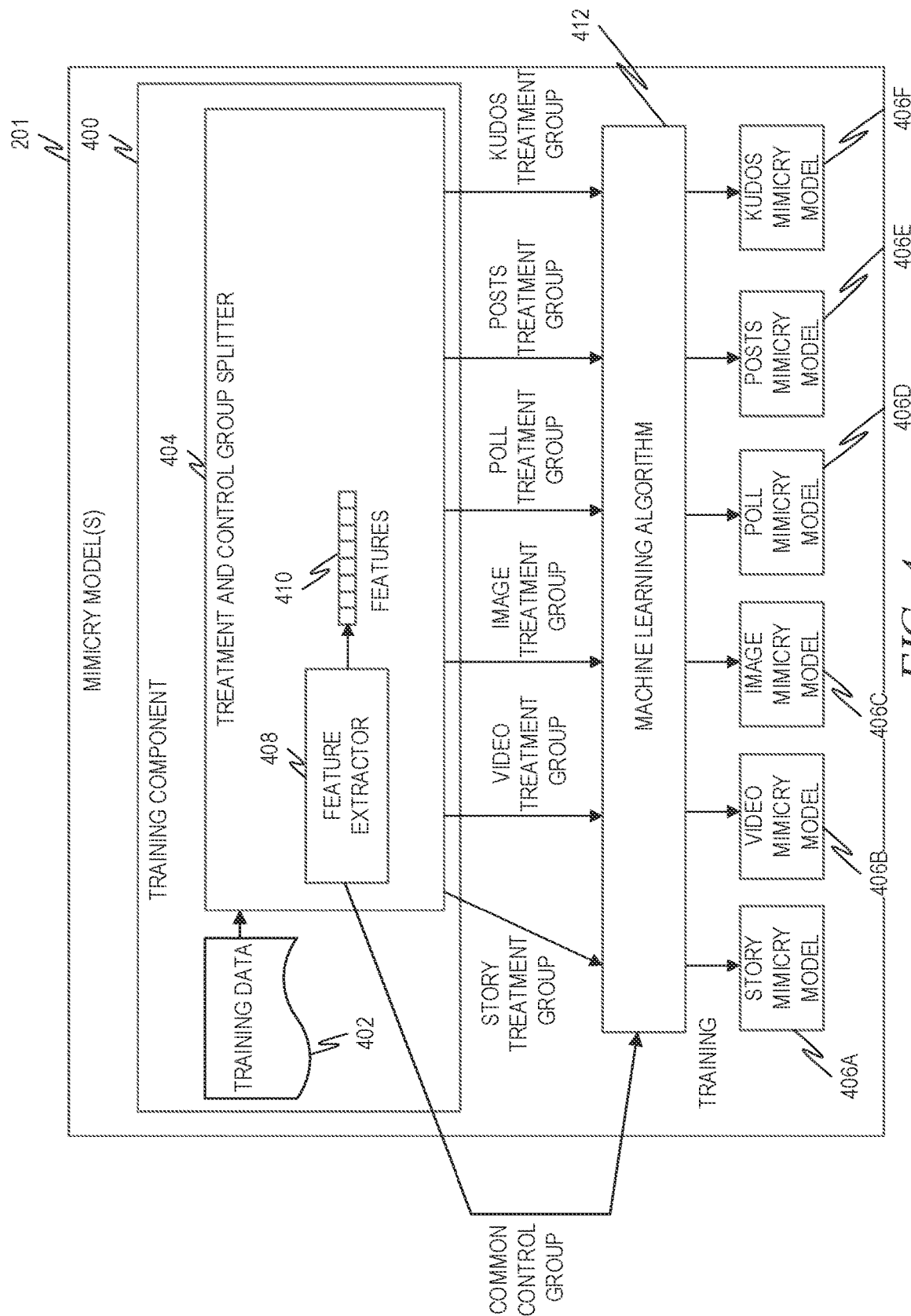
FIG. 4 is a block diagram illustrating the one or more mimicry models of FIG. 2 in more detail, in accordance with an example embodiment.

FIG. 4 is a block diagram illustrating the one or more mimicry models 201 of FIG. 2 in more detail, in accordance with an example embodiment. In a training component 400, training data 402, which may include member profiles and/or member activity and behavior information, are fed to a treatment and control group splitter 404. The treatment and control group splitter 404 acts to split the training data into one or more treatment groups and a common control group. Each of the one or more treatment groups corresponds to a different item type on which mimicry effects are suspected. Each such different item type is also assigned its own mimicry model 406A-406F. Here, there are six treatment groups, one each for the item type of story, video, image, poll, posts, and kudos. Thus, mimicry model 406A is the story mimicry model and receives training data for the story treatment group, as well as for the common control group. Likewise, mimicry model 406B is the video mimicry model, and receives training data for the video treatment group, as well as the same common control group received by the story mimicry model 406A.

The treatment and control group splitter 404 ensures that training data pertaining to users who have interacted with items of a particular type are added to the treatment group for that same particular type. Thus, for example, users who have interacted with images will have their corresponding training data added to the image treatment group. The treatment and control group splitter 404 further ensures that training data of users who have interacted with items of the particular type are not added to the common control group, and indeed that training data of users who have interacted with items of any of the treatment types are not added to the common control group. This does not mean that users whose training data in the common control group have not interacted with any items. It just means that those users have not interacted with any items of the types that have treatment groups (here, story, video, image, poll, posts and kudos).

It should be noted that the term "splitting," as used in this document, shall not be interpreted strictly to require absolute division of training data into one group or another. It is quite possible, for example, for the same piece of training data to be assigned to two separate treatment groups, such as in the example where the corresponding user interacted with items of an item type corresponding to a first treatment group and an item type corresponding to a second treatment group.

It should also be noted that while the "item types" described herein largely relate to the item's structure (e.g., whether the item itself is a video, or image, or post, etc.), there is nothing that requires that the item types be defined based on an item's structure. Item types may be defined based on any property of the item, and other item types may be defined based on, for example, the type of author/creator of the item, geographical location to which the item pertains, topic the item corresponds to, and so forth.

The treatment and control group splitter may utilize a feature extractor 408, which acts to extract curated features 410 from the training data. A feature is a variable pertaining to an input piece of data. Since the input may, in some example embodiments, be data related to a member of a social networking service, such as a member profile, member usage and/or activity data, or social graph information, the feature may be, for example, a portion of the member profile, member usage and/or activity data, or social graph. The feature may also be a variable calculated from a portion of the data, such as an average, sum, difference, measurement, and so forth. The feature may also be some aspect of the sample feed objects, such as title, frequently appearing terms, and/or various metrics about the object, such as frequency of occurrence of key words.

In an example embodiment, the curated features 410 are then passed to the individual mimicry models 406A-406F, for both treatment groups and the common control group, and used as input to a machine learning algorithm 412 to train each separate mimicry model 406A-406F to generate a mimicry score indicative of a predicted effect of the mimicry phenomenon with respect to a user being presented with an item of the corresponding item type.

The machine learning algorithm 412 is a deep learning counterfactual regression machine learning algorithm. The algorithm operates by optimizing for the prediction accuracy on the outcome estimates while minimizing the distribution difference between treatment and control groups in an embedding space. More particularly, estimating the function $\tau(x)$ is performed by learning two functions $m_0(x)$ and $m_1(x)$ using samples from $p(Y_t|x, t)$. An end-to-end, regularized minimization procedure, which simultaneously fits both a balanced representation of the data and a hypothesis for the outcome, may be used.

More particularly, an upper bound is provided for variances caused by the populations in the treatment groups by using an Integral Probability Metric (IPM) measure of distance between two distributions $p(x|t=0)$ (the control group) and $p(x|t=1)$ (the treatment group). In an example embodiment, two specific IPMs may be used: the maximum mean discrepancy and the Wasserstein distance.

The expected error in learning the individual treatment effect function $\tau(x)$ is upper bounded by the error of learning $Y_1$ and $Y_0$, plus the IPM term. In the randomized controlled trial setting, where $t \perp\!\!\!\perp x$, the IPM term is 0, and the bound naturally reduces to a standard learning problem of learning two functions.

In an example embodiment, hypotheses are jointly learned for both treated and control groups on top of a representation that minimizes a weighted sum of the factual loss and the IPM distance between the control and treated distributions induced by the representation. This can be viewed as learning the functions $m_0$ and $m_1$ under a constraint that encourages better generalization across the treated and control populations.

Figure 5:
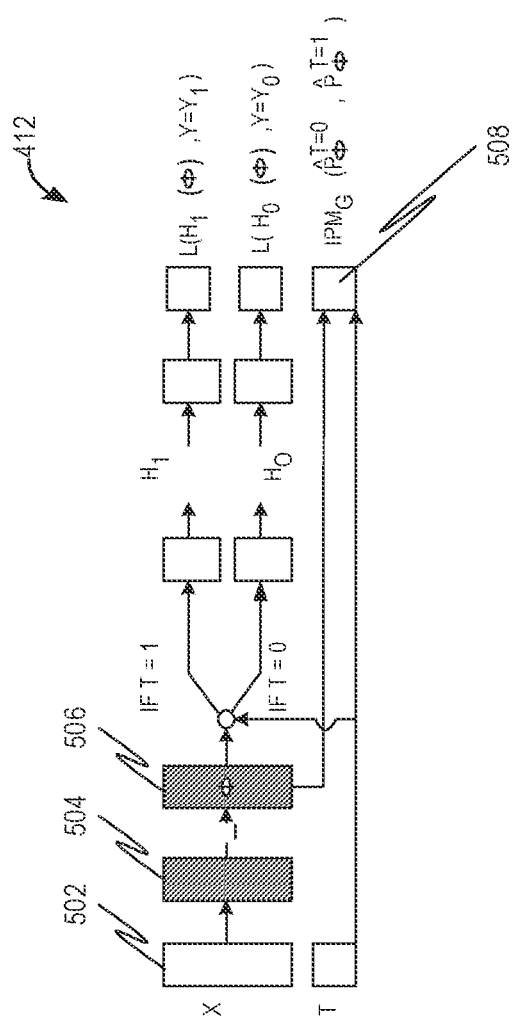
FIG. 5 is a block diagram illustrating a machine learning algorithm, in accordance with an example embodiment.

In an example embodiment, the machine learning algorithm 412 is implemented using multi-layer neural nets as representations and hypotheses, along with Maximum Mean Discrepancy (MMD) or Wasserstein distributional distances over a representation layer. FIG. 5 is a block diagram illustrating a machine learning algorithm 412, in accordance with an example embodiment. Here, the machine learning algorithm 412 seeks a representation $\phi$ and hypothesis h that minimizes a trade-off between predictive accuracy and imbalance in a representational space, using the following objective:

$$\min_{\substack{h,\Phi \\ \|\Phi\|=1}} \frac{1}{n}\sum_{i=1}^{n} w_i \cdot L(h(\Phi(x_i), t_i), y_i) +$$

$$\lambda \cdot \mathcal{R}(h) + \alpha \cdot IPM_G\big(\{\Phi(x_i)\}_{i:t_i=0}, \{\Phi(x_i)\}_{i:t_i=1}\big),$$

$$\text{with } w_i = \frac{t_i}{2u} + \frac{1-t_i}{2(1-u)}, \text{ where } u = \frac{1}{n}\sum_{i=1}^{n} t_i,$$

and $\mathcal{R}$ is a model complexity term.

Note that u=p(t=1) in the definition of $w_1$ is simply the proportion of treated units in the population. The weights $w_i$ compensate for the difference in treatment group size in the sample.

The result is a neural network that is structured to reduce the selection bias when using observation data (i.e., the distribution imbalance between treatment and control data, which is a major source of errors in causal inference). The network can be partitioned into several groups and the number of layers in each group is task dependent (tunable hyperparameters). The layers 502, 504, 506, from x to $\Phi$, are the "foundation" layers which aim to transform observation data, x, such that the distribution between treatment and control data is as close to each other as possible at layer $\Phi$ 506, i.e., reducing selection bias. Then based on layer $\Phi$ 506, it branches out to predict the output y under treatment (t=1) and control (t=0) conditions, which will be used for calculating individual treatment effects. The IPM component 508 is the measure of the distribution discrepancy (or selection bias) under treatment and control so that this value will be in evaluating the performance of the model/network.

Training may involve using stochastic gradient descent, where the error is backpropagated through both the hypothesis and representation networks. This is represented by the following pseudocode. Both the prediction loss and the penalty term $IPM_G(.,.)$ are computed for one minibatch at a time.

| CFR: Counterfactual regression with integral probability metrics |
|---|
| 1: Input: Factual sample $(x_i, t_1, y_1), \ldots, (x_n, t_n, y_n)$, scaling parameter $\alpha > 0$, loss function $L(\cdot, \cdot)$, representation network $\Phi_W$ with initial weights W, outcome network $h_V$ with initial weights V, function family G for IPM. |
| 2: Compute $u = \frac{1}{n}\sum_{i=1}^{n} t_i$ |
| 3: Compute $w_i = \frac{t_i}{2u} + \frac{1-t_i}{2(1-u)}$ for $i = 1 \ldots n$ |
| 4: while not converged do |
| 5: Sample mini-batch $\{i_1, i_2, \ldots, i_m\}$ |
| 6: Calculate the gradient of the IPM term: $g_1 = \nabla_W IPM_G(\{\Phi_W(x_{i_j})\}_{t_{i_j}=0}, \{\Phi_W(x_{i_k})\}_{t_{i_j}=k})$ |
| 7: Calculate the gradient of the empirical term: |

| CFR: Counterfactual regression with integral probability metrics |
|---|
| $g_2 = \nabla_W \frac{1}{M}\sum_j w_{i_j} \cdot L\big(h_V(\Phi_W(x_{i_j}), t_{i_j}), y_{i_j}\big)$ |
| $g_3 = \nabla_W \frac{1}{M}\sum_j w_{i_j} \cdot L\big(h_V(\Phi_W(x_{i_j}), t_{i_j}), y_{i_j}\big)$ |
| 8. Obtain step size scalar or matrix $\eta$ with standard neural net methods e.g. Adam (Kingma & Ba, 2014) |
| 9. $\{W, V\} \leftarrow [W - \eta(\alpha g_1 + g_3), V - \eta(g2 + 2\lambda V)]$ |
| 10. Check convergence criterion |
| 11. end while |

Referring back to FIG. 4, user information for a particular user as well as information about a particular item (such as the particular item's type) are fed to a feature extractor, such a feature extractor 408 which acts to extract curated features from this information. The curated features are then used as input to the mimicry model 406A-406F corresponding to the item's type, which outputs a score indicating the likelihood that a mimicry phenomenon will affect the particular user if presented with the particular item. This score can then be input to the ranking model 202, which can use it when determining how high to rank the particular item in the particular user's feed. As will be described in more detail later, in other example embodiments, the mimicry score is alternatively, or in addition to the ranking model use, used in determining which particular user interface to present to the particular user, and specifically whether user interface elements regarding particular item types should be displayed or not displayed, and how prominently, in a screen of a user interface being presented to the particular user.

Figure 6:
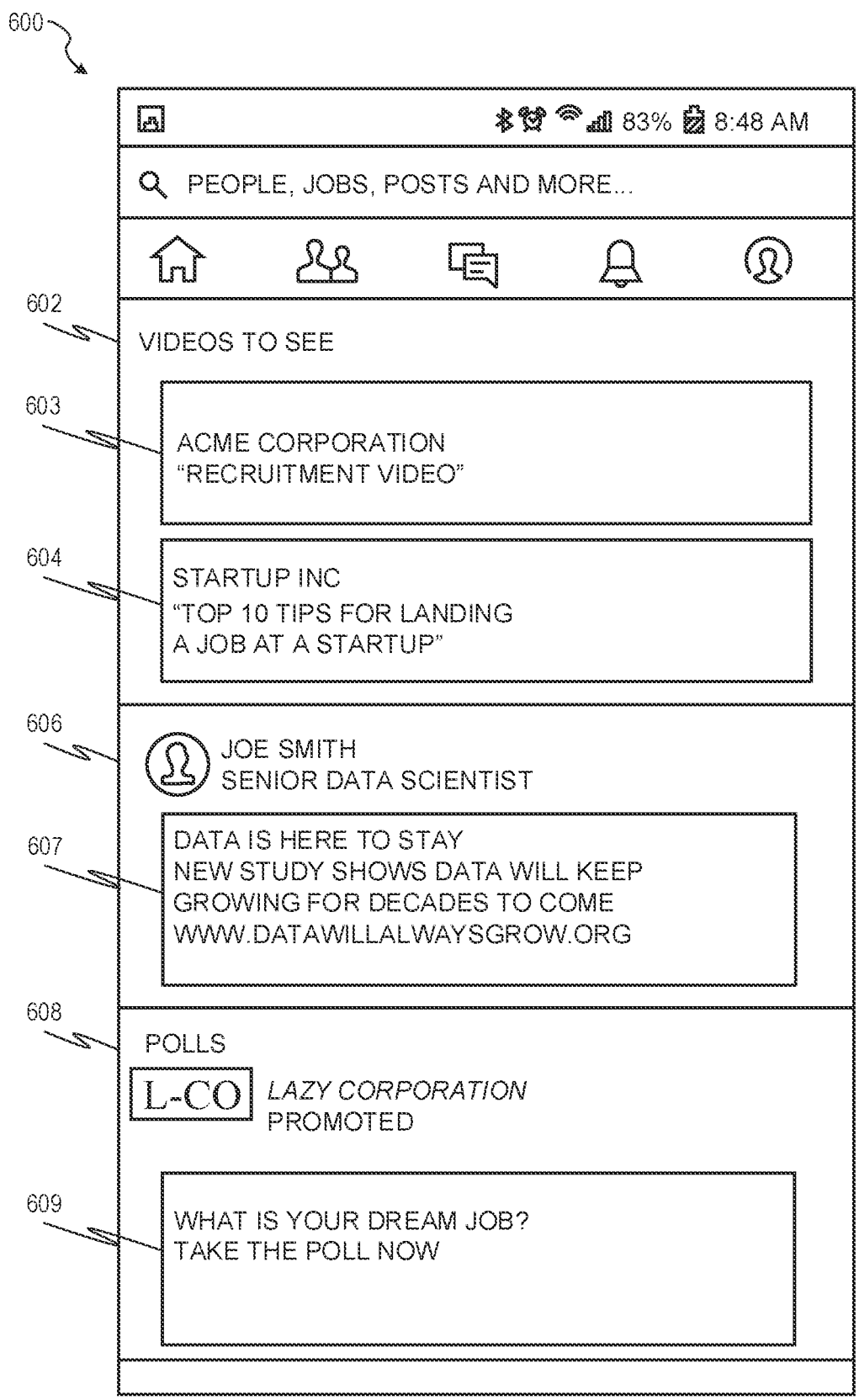
FIG. 6 is a screenshot of a user feed that includes items in different categories, according to some example embodiments.

FIG. 6 is a screenshot of a user feed 600 that includes items in different categories, according to some example embodiments. In the example embodiment of FIG. 6, the user feed 600 includes different categories, such as videos 602, user posts 606, and polls 608, and other embodiments may include additional categories.

In one example embodiment, the user feed 600 provides the videos 602 (e.g., job posts 603 and 604) that match the interests of the user.

The user posts 606 include items 607 posted by users of the social networking service (users such as ones connected to the user) to make comments on the social networking service or include articles or webpages of interest.

The polls 608 are items 609 that prompt the user to enter answers to multiple choice questions.

Although the categories are shown as separated within the user feed 600, the items from the different categories may be intermixed and not just be presented as a block. Thus, the user feed 600 may include a large number of items from each of the categories, and the social networking service decides the order in which these items are presented to the user based on the desired utilities.

In an example embodiment, the mimicry scores are used to alter the presentation of this user interface to make certain item types/categories more prominent and others less prominent. For example, a strongly positive mimicry score for images and a strongly negative mimicry score for videos may cause the user interface to replace the videos 602 section with an images section. Alternatively, if the mimicry score for videos is more neutral (i.e., closer to zero), the user interface may simply move the videos 602 section down in the display while placing the images section at the top.

Figure 7:
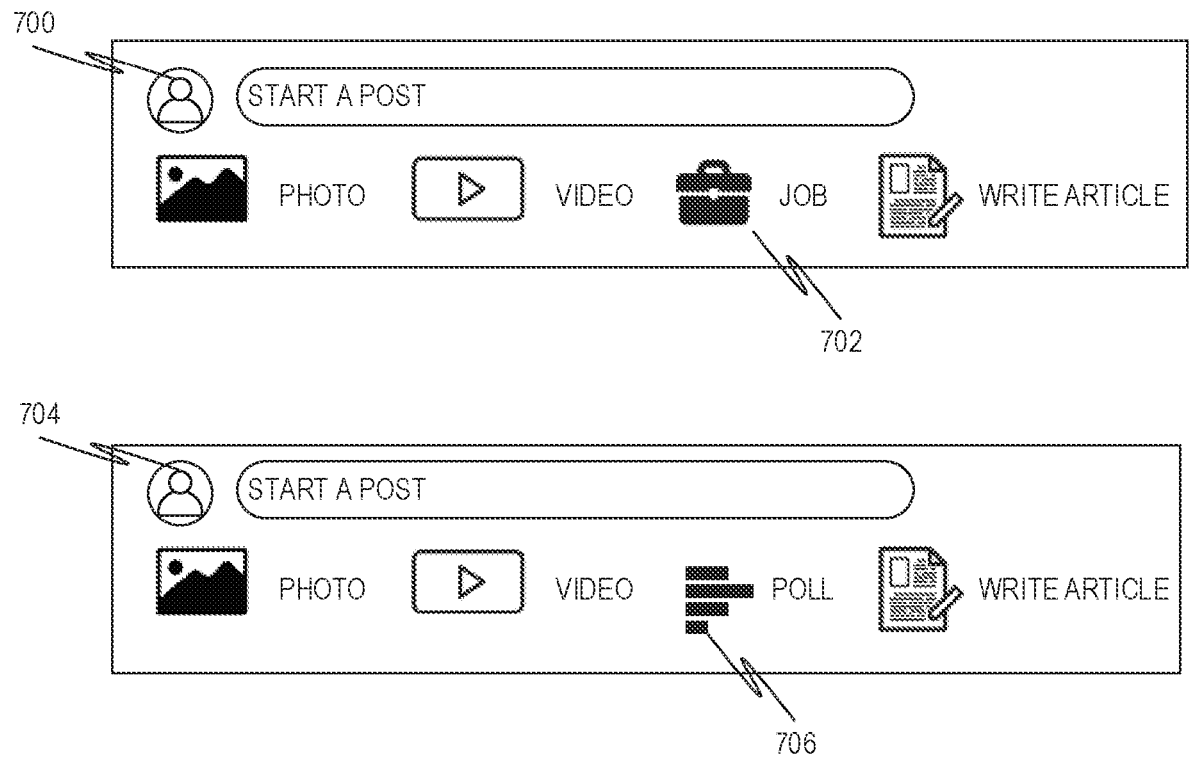
FIG. 7 is a screenshot of different iterations of shareboxes, in accordance with an example embodiment.

In another example embodiment, a sharebox user interface may be altered based on the mimicry scores. A sharebox is a user interface element where a user is able to select a content type for a post to be created. FIG. 7 is a screenshot of different iterations of shareboxes, in accordance with an example embodiment. Here, in sharebox 700, the user interface element "job" 702 may be placed in the third slot for users who have a high mimicry score for job. In sharebox 704, the user interface element "poll" 706 may be placed in the third slot for users who have a high mimicry score for polls.

Figure 8:
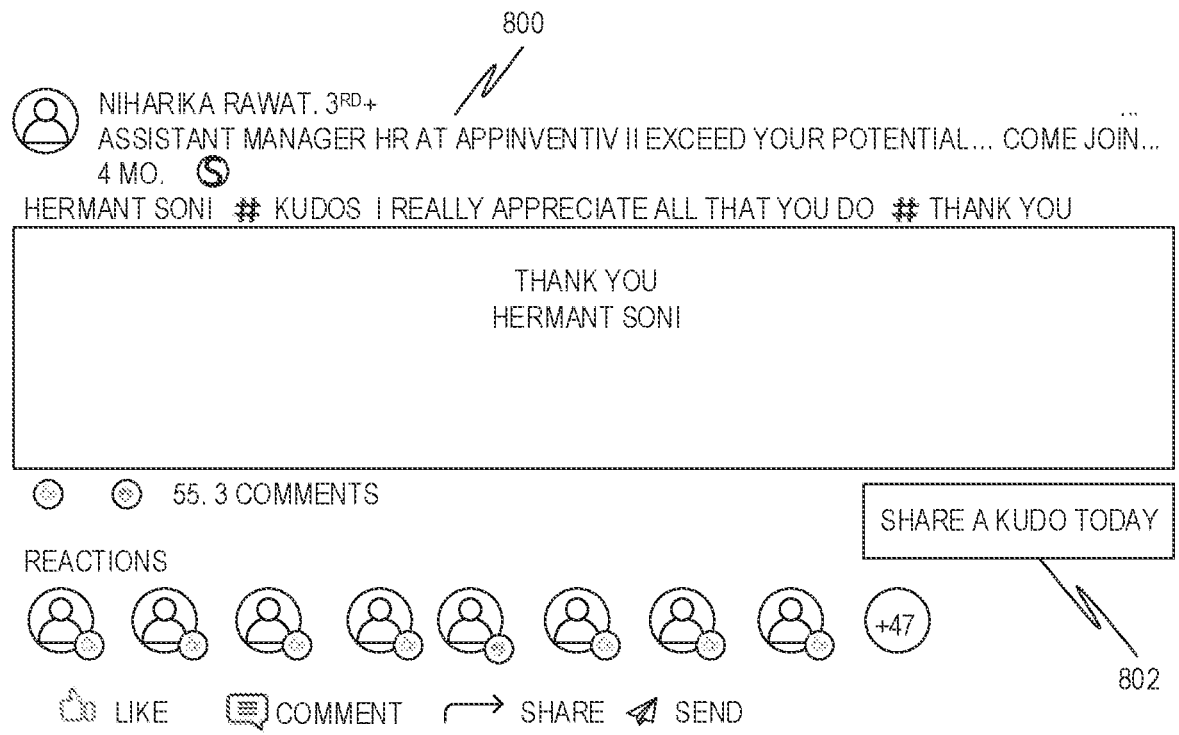
FIG. 8 is a screenshot of a user interface, in accordance with an example embodiment.

In another example embodiment, a creation prompt may be added to a user interface based on the mimicry scores. FIG. 8 is a screenshot of a user interface 800, in accordance with an example embodiment. Here, a user interface element 802 has been added asking the user to share a kudo today, due to a high mimicry score for the kudos item type. Selecting this user interface element 802 brings the user to a sharing flow of user interface screens allowing the user to select the type of details of the kudo to be shared. Similar user interfaces may be added for other item types if their corresponding mimicry scores so indicate.

Figure 9:
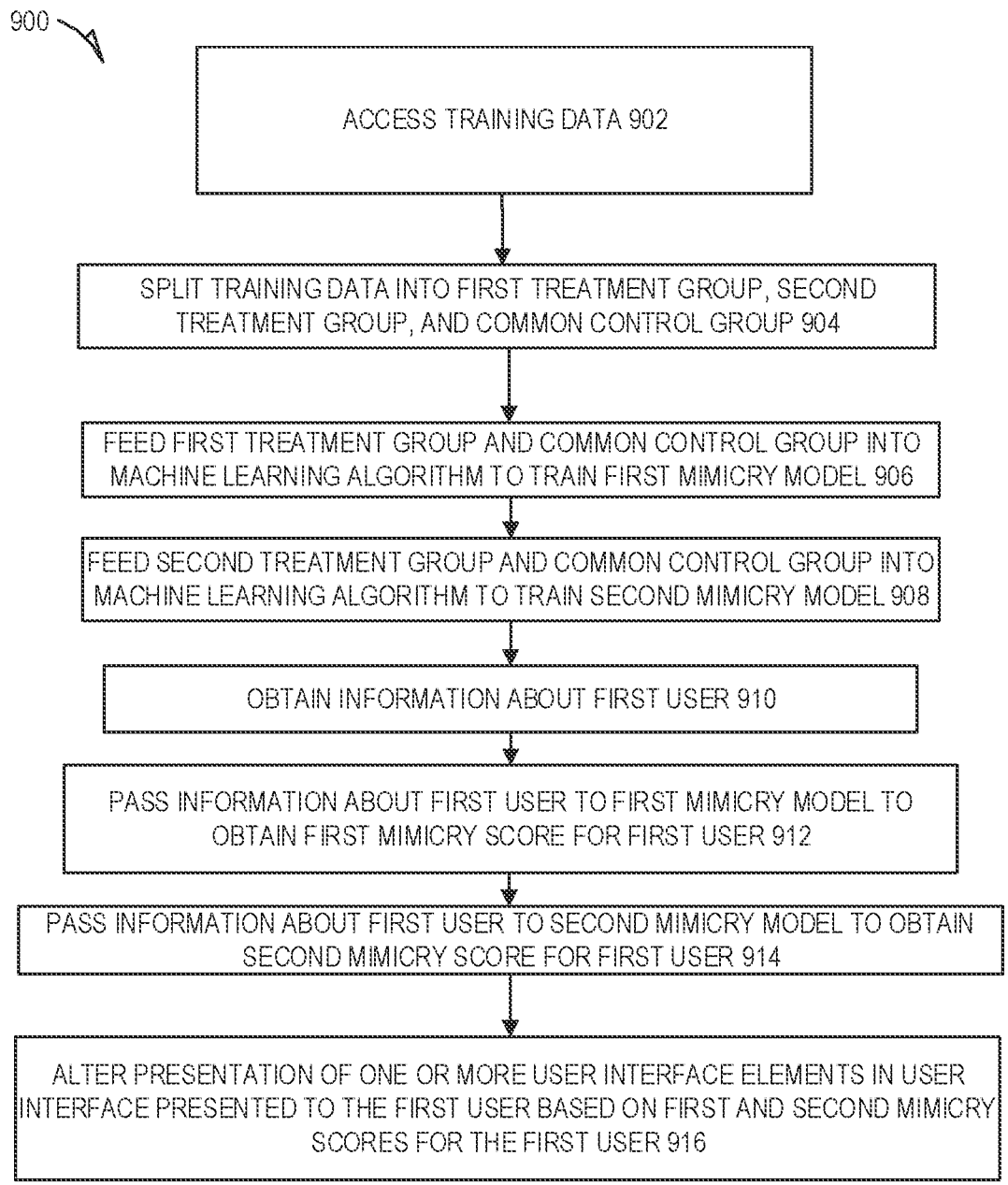
FIG. 9 is a flow diagram illustrating a method for training a neural network, in accordance with an example embodiment.

FIG. 9 is a flow diagram illustrating a method 900 for training a neural network, in accordance with an example embodiment. At operation 902, training data corresponding to a plurality of users is accessed. The training data includes information about user interaction with items of a plurality of item types in an online network. At operation 904, the training data is split into a first treatment group, a second treatment group, and a common control group. The first treatment group includes training data containing training data corresponding to users who interacted with items of a first item type, the second treatment group includes training data corresponding to users who interacted with items of a second item type, and the common control group includes training data corresponding to users who did not interact with items of either the first item type or the second item type.

At operation 906, the first treatment group and the common control group are fed into a machine learning algorithm to train a first mimicry model to output a first mimicry score indicative of predicted impact of a mimicry effect on a user presented with an item of the first item type. The machine learning algorithm is a counterfactual regression neural network. At operation 908, the second treatment group and the common control group are fed into the machine learning algorithm to train a first mimicry model to output a first mimicry score indicative of predicted impact of a mimicry effect on a user presented with an item of the second item type.

At operation 910, information about a first user is obtained. At operation 912, the information about the first user is passed to the first mimicry model to obtain a first mimicry score for the first user. At operation 914, the information about the first user is passed to the second mimicry model to obtain a second mimicry score for the first user. At operation 916, based on the first mimicry score and the second mimicry score, presentation of one or more user interface elements corresponding to items of the first type and presentation of one or more user interface elements corresponding to items of the second type in a user interface presented to the first user are altered.

Figure 10:
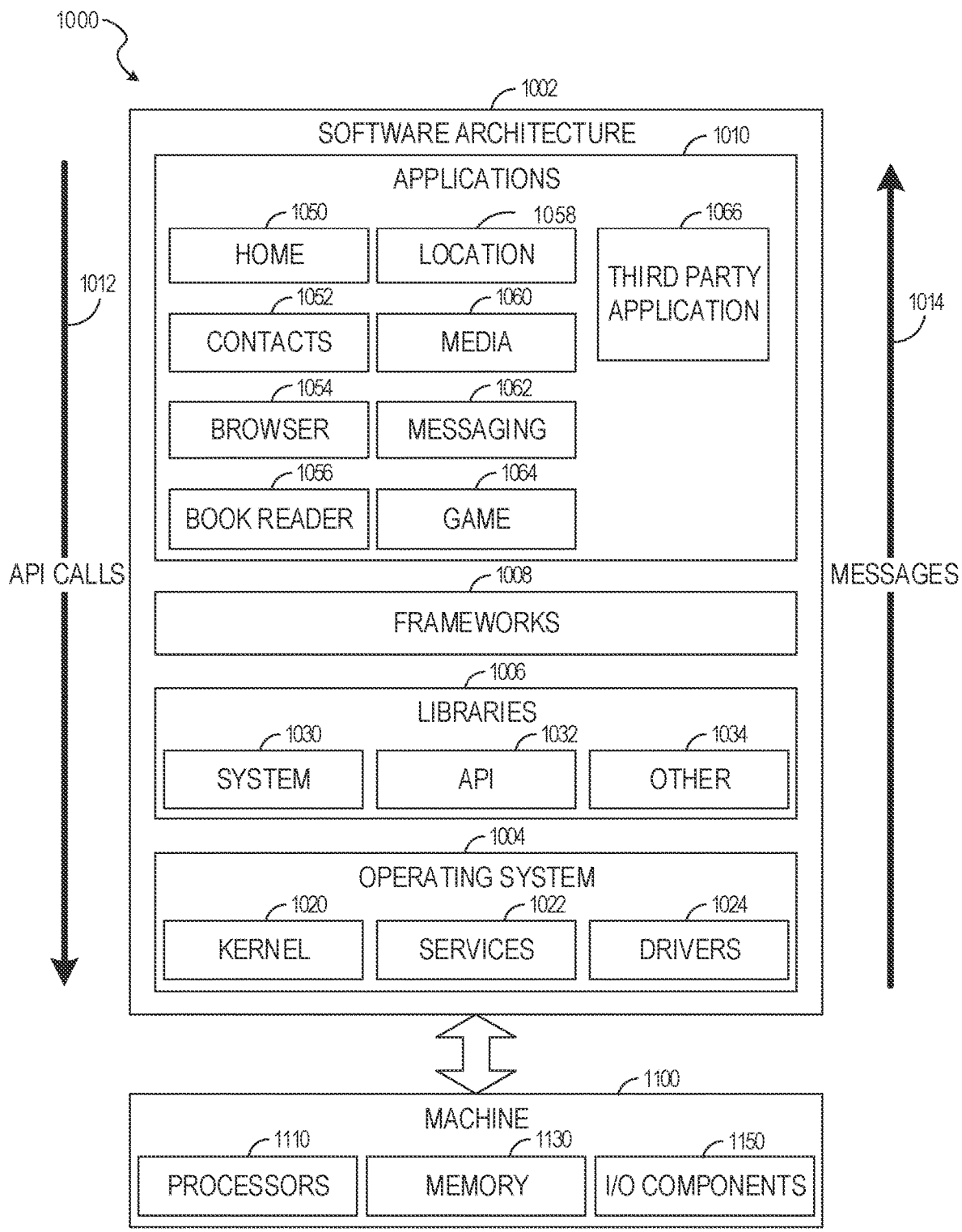
FIG. 10 is a block diagram illustrating an architecture of software, which can be installed on any one or more of the devices described above.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphical user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Figure 11:
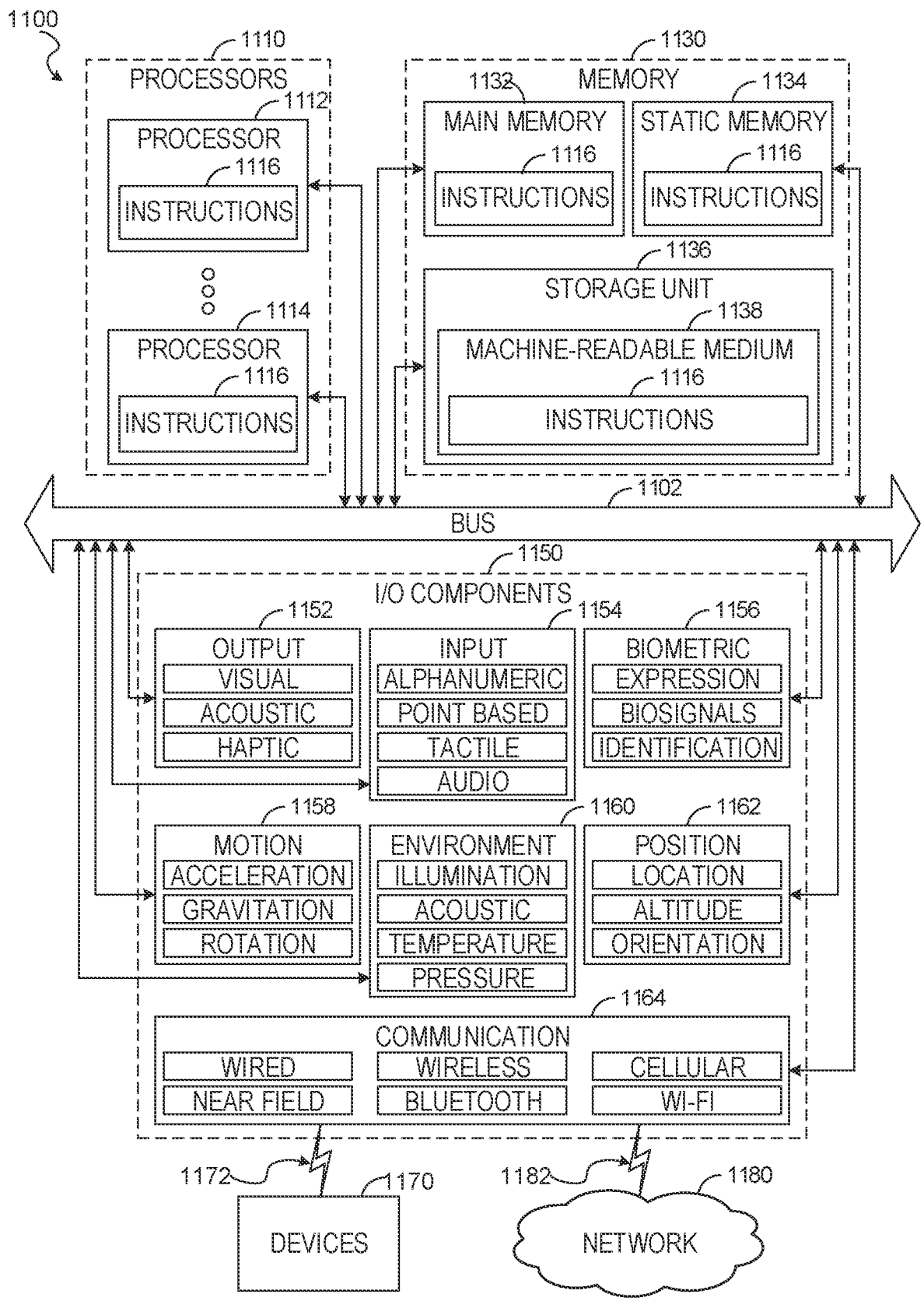
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein may be executed. For example, the instructions 1116 may cause the machine 1100 to execute the method 900 of FIG. 9. Additionally, or alternatively, the instructions 1116 may implement FIGS. 1-9, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1116 and/or data. The terms shall accordingly be taken to include, but not be limited to, solid-state memories, and optical and magnetic media, including memory internal or external to the processors 1110. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   a memory; and
   a computer-readable medium having instructions stored thereon, which, when executed by a processor, cause the system to perform operations comprising:
   accessing training data corresponding to a plurality of users, the training data including information about user interactions with items of a plurality of item types in an online network;
   splitting the training data into a first treatment group, a second treatment group, and a common control group, the first treatment group including training data corresponding to users who interacted with items of a first item type, the second treatment group including training data corresponding to users who interacted with items of a second item type, and the common control group including training data corresponding to users who did not interact with items of either the first item type or the second item type;
   feeding the first treatment group and the common control group into a machine learning algorithm to train a first mimicry model to output a first mimicry score indicative of a mimicry effect on a user presented with an item of the first item type, the machine learning algorithm being a counterfactual regression neural network, wherein a mimicry score comprises a delta between a probability of a user interacting with an item of a corresponding item type if the user was previously exposed to items of the corresponding item type and a probability of the user interacting with an item of the corresponding item type if the user was not previously exposed to items of the corresponding item type, the delta comprising a positive or negative correlation to interactions with previously exposed items of the corresponding item type;
   feeding the second treatment group and the common control group into the machine learning algorithm to train a second mimicry model to output a second mimicry score indicative of a mimicry effect on a user presented with an item of the second item type;
   ranking, by a ranking model, feed objects for a user based on the first mimicry score and the second mimicry score, the feed objects comprising items of the first item type and items of the second item type; and
   updating a feed of the user with a feed object based on the ranking of feed objects.

2. The system of claim 1, wherein training data in the first treatment group overlaps with training data in the second treatment group.

3. The system of claim 1, wherein the operations further comprise:
   obtaining information about a first user;
   passing the information about the first user to the first mimicry model to obtain a first mimicry score for the first user;
   passing the information about the first user to the second mimicry model to obtain a second mimicry score for the first user;
   based on the first mimicry score and the second mimicry score, altering presentation of one or more user interface elements corresponding to items of the first type and presentation of one or more user interface elements corresponding to items of the second type in a user interface presented to the first user.

4. The system of claim 3, wherein the altering presentation includes changing how prominently items of the first type are displayed in the user interface based on the first mimicry score for the first user.

5. The system of claim 4, wherein the altering presentation includes removing a user interface element corresponding to items of the first type, in the user interface, based on the first mimicry score.

6. The system of claim 1, wherein the counterfactual regression neural network learns a function for the common control group and a function for a treatment group under a constraint that optimizes generalization across the control and treatment groups.

7. The system of claim 6, wherein the counterfactual regression neural network calculates an integral probability metric of distance between a control distribution and a treatment distribution.

8. The system of claim 7, wherein the integral probability metric is maximum mean discrepancy.

9. The system of claim 7, wherein the integral probability metric is Wasserstein distance.

10. A method comprising:
    accessing training data corresponding to a plurality of users, the training data including information about user interaction with items of a plurality of item types in an online network;
    splitting the training data into a first treatment group, a second treatment group, and a common control group, the first treatment group including training data corresponding to users who interacted with items of a first item type, the second treatment group including training data corresponding to users who interacted with items of a second item type, and the common control group including training data corresponding to users who did not interact with items of either the first item type or the second item type;
    feeding the first treatment group and the common control group into a machine learning algorithm to train a first mimicry model to output a first mimicry score indicative of a mimicry effect on a user presented with an item of the first item type, the machine learning algorithm being a counterfactual regression neural network, wherein a mimicry score comprises a delta between a probability of a user interacting with an item of a corresponding item type if the user was previously exposed to items of the corresponding item type and a probability of the user interacting with an item of the corresponding item type if the user was not previously exposed to items of the corresponding item type, the delta comprising a positive or negative correlation to interactions with previously exposed items of the corresponding item type;

feeding the second treatment group and the common control group into the machine learning algorithm to train a second mimicry model to output a second mimicry score indicative of a mimicry effect on a user presented with an item of the second item type;

ranking, by a ranking model, feed objects for a user based on the first mimicry score and the second mimicry score, the feed objects comprising items of the first item type and items of the second item type; and updating a feed of the user with a feed object based on the ranking of feed objects.

11. The method of claim 10, wherein training data in the first treatment group overlaps with training data in the second treatment group.

12. The system of claim 10, further comprising:
obtaining information about a first user;
passing the information about the first user to the first mimicry model to obtain a first mimicry score for the first user;
passing the information about the first user to the second mimicry model to obtain a second mimicry score for the first user;
based on the first mimicry score and the second mimicry score, altering presentation of one or more user interface elements corresponding to items of the first type and presentation of one or more user interface elements corresponding to items of the second type in a user interface presented to the first user.

13. The method of claim 12, wherein the altering presentation includes changing how prominently items of the first type are displayed in the user interface based on the first mimicry score for the first user.

14. The method of claim 12, wherein the altering presentation includes removing a user interface element corresponding to items of the first type, in the user interface, based on the first mimicry score.

15. The method of claim 10, wherein the counterfactual regression neural network learns a function for the common control group and a function for a treatment group under a constraint that optimizes generalization across the control and treatment groups.

16. The method of claim 15, wherein the counterfactual regression neural network calculates an integral probability metric of distance between a control distribution and a treatment distribution.

17. The method of claim 16, wherein the integral probability metric is maximum mean discrepancy.

18. The method of claim 16, wherein the integral probability metric is Wasserstein distance.

19. A system comprising:
means for accessing training data corresponding to a plurality of users, the training data including information about user interaction with items of a plurality of item types in an online network;
means for splitting the training data into a first treatment group, a second treatment group, and a common control group, the first treatment group including training data corresponding to users who interacted with items of a first item type, the second treatment group including training data corresponding to users who interacted with items of a second item type, and the common control group including training data corresponding to users who did not interact with items of either the first item type or the second item type;
means for feeding the first treatment group and the common control group into a machine learning algorithm to train a first mimicry model to output a first mimicry score indicative of a mimicry effect on a user presented with an item of the first item type, the machine learning algorithm being a counterfactual regression neural network, wherein a mimicry score comprises a delta between a probability of a user interacting with an item of a corresponding item type if the user was previously exposed to items of the corresponding item type and a probability of the user interacting with an item of the corresponding item type if the user was not previously exposed to items of the corresponding item type, the delta comprising a positive or negative correlation to interactions with previously exposed items of the corresponding item type;
means for feeding the second treatment group and the common control group into the machine learning algorithm to train a second mimicry model to output a second mimicry score indicative of a mimicry effect on a user presented with an item of the second item type;
ranking, by a ranking model, feed objects for a user based on the first mimicry score and the second mimicry score, the feed objects comprising items of the first item type and items of the second item type; and
updating a feed of the user with a feed object based on the ranking of feed objects.

20. The system of claim 19, wherein training data in the first treatment group overlaps with training data in the second treatment group.

* * * * *